May 29, 1923.
L. A. PANNELL
PLOWFOOT ADJUSTER
Filed Dec. 13, 1921
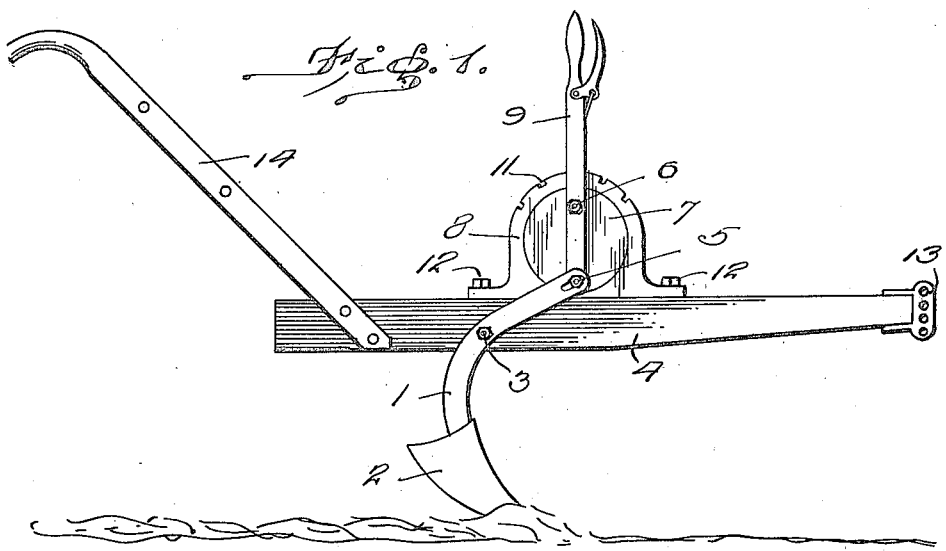
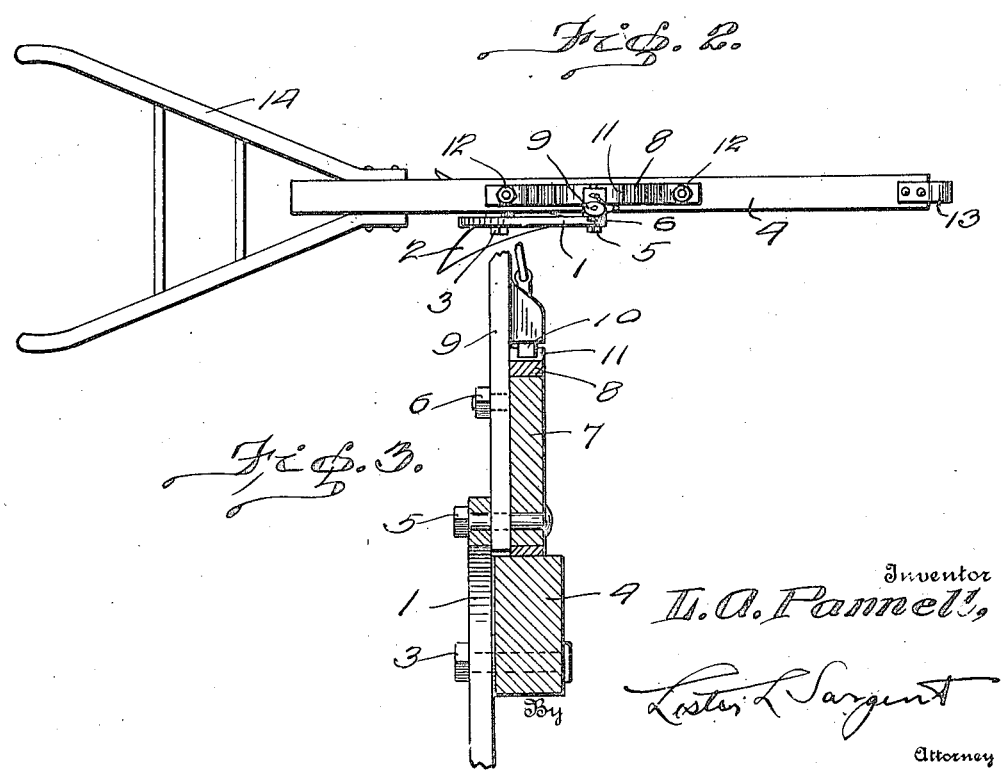

Patented May 29, 1923.

1,456,647

UNITED STATES PATENT OFFICE.

LUCIUS A. PANNELL, OF ATLANTA, GEORGIA.

PLOWFOOT ADJUSTER.

Application filed December 13, 1921. Serial No. 522,142.

*To all whom it may concern:*

Be it known that I, LUCIUS A. PANNELL, a citizen of the United States, residing at Atlanta, in the county of Fulton and State of Georgia, have invented a new and useful Plowfoot Adjuster, of which the following is a specification.

The object of my invention is to provide a novel plow foot adjuster consisting of relatively few parts for effectively raising and lowering the plow share relative to the beam; to provide novel means of operation; and to provide the novel combination and arrangement of parts hereinafter described and disclosed in the accompanying drawings, in which—

Figure 1 is a side elevation of the invention;

Fig. 2 is a top plan view of same; and

Fig. 3 is a vertical section on a plane parallel with lever 9, partly in elevation.

Like numerals designate like parts in each of the several views.

Referring to the accompanying drawings I provide a plow beam 4 having the usual plow handles 14 and clevis 13 and having a pivotally mounted plow arm 1 swingable on the fulcrum 3 and carrying a suitable blade or plow share 2. I provide a suitably notched segment 8 bolted to the plow beam 4 by bolts 12 and having notches 11. The notches of segment 11 are releasably engageable by the spring controlled tooth 10 of the conventional adjusted hand lever 9, as shown. The hand lever 9 is rigidly affixed to the disk 7 which it operates as it is swung on the segment device. The slotted upper end of plow arm 1 is loosely or slidably connected by bolt or pivot 5 on the lower portion of the disk 7, as shown in Fig. 1, so as to give a swinging action to the plow arm 1 and when the hand lever 9 is moved backward or forward to raise or lower the plow, as will be understood by reference to the drawings. The rotatable disk or movable member 7 is rotatably mounted in member 8, as shown in Fig. 3. Bolt 6 extends through the upper portion of disk 7 and adjusting lever 9, as indicated in Fig. 3. On swinging the hand lever forward or backward the disk or movable member 7 and plow arm 1 are operated synchronously to raise or lower the plow share carried by the plow arm.

It is often the case that the operator wishes to adjust the plow share or plow foot so as to make it either cut a deep furrow or just skim along on the ground. Heretofore it has been customary to effect this adjustment by taking out a number of bolts. This troublesome procedure is eliminated by the simple operation of the adjusting lever controlling a pivoted plow arm operatively connected to it as above described.

It is within the contemplation of my invention to make minor modifications in the shape and size of the essential elements of my device, within the scope of the appended claims.

What I claim is—

1. In a plow foot adjuster, the combination of a plow arm having a conventional notched segment, an adjusting lever, a rotatable disk mounted in the segment and to the upper portion of which the lever is bolted, a plow beam, a plow arm fulcrumed on said beam, the upper end of the plow arm being loosely pivoted on the lower portion of the aforesaid disk.

2. In a plow foot adjuster, the combination with a plow beam, of a plow arm fulcrumed thereon, a notched segment affixed to the plow beam, a hand lever operatively engageable with the notched segment, a rotatable disk positioned within the notched segment, means operatively connecting the upper end of the plow arm with the lower end of the hand lever, and means loosely connecting the lower portion of said hand lever to the upper end of the plow arm.

LUCIUS A. PANNELL,